United States Patent [19]
Krolick

[11] Patent Number: 5,644,998
[45] Date of Patent: Jul. 8, 1997

[54] ALL PURPOSE MULCH SYSTEM

[76] Inventor: Edward Krolick, 230 Peconic St., Ronkonkoma, N.Y. 11779

[21] Appl. No.: 403,511

[22] Filed: Mar. 13, 1995

[51] Int. Cl.$^6$ ................................................ A01C 11/00
[52] U.S. Cl. ........................ 111/102; 111/900; 43/114; 47/9
[58] Field of Search ............................ 47/95, 56, 25; 111/102, 230, 900, 199; 43/114

[56] References Cited

U.S. PATENT DOCUMENTS

| | | | |
|---|---|---|---|
| 1,377,566 | 5/1921 | Eckart | 47/95 |
| 1,553,035 | 9/1925 | Eckart | 47/95 |
| 1,846,274 | 2/1932 | Otwell | 47/95 |
| 1,954,424 | 4/1934 | Otwell | 47/95 |
| 2,030,267 | 2/1936 | Pratt | 47/95 |
| 3,384,993 | 5/1968 | Kane | 47/95 |
| 3,556,026 | 1/1971 | Houston | 47/95 |
| 3,557,491 | 1/1971 | Franklin et al. | 47/95 |
| 3,559,599 | 2/1971 | Hoadley | 111/102 |
| 3,580,196 | 5/1971 | Lofgreen | 111/102 |
| 3,805,446 | 4/1974 | Aoyagi | 47/9 S |
| 3,810,328 | 5/1974 | Bryan, Jr. et al. | 47/9 S |
| 3,934,999 | 1/1976 | Meier | 383/103 |
| 3,945,330 | 3/1976 | Leavitt et al. | 111/102 |
| 3,998,006 | 12/1976 | Riedel | 47/95 |
| 4,423,703 | 1/1984 | Palvarini et al. | 47/9 S |
| 4,774,186 | 9/1988 | Schaefer, Jr. et al. | 47/58 |
| 4,829,702 | 5/1989 | Silvandersson | 43/114 |
| 4,896,453 | 1/1990 | Jacob | 47/95 |
| 4,934,094 | 6/1990 | Walton | 47/95 |
| 5,009,031 | 4/1991 | Knop et al. | 47/95 |
| 5,070,643 | 12/1991 | Hinsperger | 47/95 |
| 5,175,131 | 12/1992 | Lang et al. | 47/9 |
| 5,245,785 | 9/1993 | Taniguchi et al. | 47/95 |
| 5,253,448 | 10/1993 | Byom | 47/114 |
| 5,274,951 | 1/1994 | Besing | 47/95 |
| 5,301,460 | 4/1994 | Corbitt | 47/95 |
| 5,396,731 | 3/1995 | Byrne | 47/25 |
| 5,458,877 | 10/1995 | Obayashi et al. | 47/9 |

FOREIGN PATENT DOCUMENTS

| | | | |
|---|---|---|---|
| 2752831 | 5/1979 | Germany | 47/9 S |
| 4224782 | 2/1994 | Germany | 47/95 |
| 2238824 | 9/1990 | Japan | 47/9 S |
| 403290522 | 12/1991 | Japan | 47/56 |
| 405023013 | 2/1993 | Japan | 47/56 |
| 556842 | 10/1943 | United Kingdom | 47/95 |
| 2068879 | 8/1981 | United Kingdom | 47/56 |

Primary Examiner—Terry Lee Melius
Assistant Examiner—Victor Batson

[57] ABSTRACT

Mulching system using opaque artificial mulching material (1) in perforated embodiments. Perforated embodiments have predetermined pattern of precisely spaced uniform holes (10) preperforated during manufacture. Preperforations allow pre-seeding before mulch is applied to effect weed prevention for densely planted wide row crops. Will also automatically provide proper spacing and eliminate need for thinning crop. Preperforation provides protection from root maggots. Some embodiments have abrasive substance (7) on top side, or abrasive substance (8) on bottom side, or on both sides to repel and destroy both slugs and snails. This is accomplished by abrasive substance (7 or 8) lacerating skin of slugs or destroying digestive tract through ingestion of abrasive substance (7 or 8), other embodiments can have weatherproof sticky substance-clear or insect attractant colored (11) applied to mulching material (1) and covered by removable protective film (9). Purpose of weatherproof sticky substance-clear or insect attractant colored (11) is to trap crawling or flying insects which can destroy crop. Removable protective film (9) is to provide easy handling until mulch is applied to soil. Insect attractant colored mulching material (12) is for luring insect to trap. Four classes of hole (10) spacing and size provided for perforated embodiments. Preferred embodiment utilizing all elements of invention is illustrated in FIGS. 8A to 8D.

9 Claims, 6 Drawing Sheets

ALL PURPOSE MULCH SYSTEM

BACKGROUND—FIELD OF INVENTION

This invention relates to agriculture and horticulture, specifically to the use of artificial mulch on wide row crops.

BACKGROUND—DESCRIPTION OF PRIOR ART

Commercial growers and individual gardeners use opaque sheets of artificial mulch for several purposes. The primary purpose is to prevent the growth of weeds among the intentionally sown crops. This is accomplished by using the mulching sheet to interdict the transmission of light to weed seeds in the soil. If a solid sheet of mulch is used, it is then necessary to provide openings through which light can reach the desired crop. U.S. Pat. No. 1,377,566, (1921) in the name of C. F. Eckart, teaches several ways to fashion openings in the mulch, as illustrated in FIGS. 5A to 5D, locating and slicing are required.

Measuring perhaps inaccurately, and cutting to establish opening for plants at the proper intervals is time consuming. It is also critical to the development of the plant that this be done properly; overcrowding causes weak, disease prone specimens. In the case of edible crops, the yield is greatly diminished. Conversely, too wide spacing is a waste of valuable space and also leads to a reduction in crop yield.

A pair of patents by R. B. Otwell, U.S. Pat. No. 1,846,274, (1931) and U.S. Pat. No. 1,954,424(1933) teach the performing of holes in the mulching material in a non-uniform plurality of groups. Design layouts and aesthetic considerations are the stated purposes of those groups. The efficient use of available space and maximization of crop yield are not prioritized. Band or wide row patterns appear in the drawings, but only in a piecemeal, non-continuous format.

The size of the hole provided for each individual plant surrounded by the mulching material is also an important factor if total advantage is to be derived from the mulch. If the hole is overly large, weeds can proliferate where they can have the most deleterious effect possible on the desired plants. By growing in close proximity to the crop plant, the roots of the weed compete directly with those of the crop for both water and vital nutrients. They may also serve to transmit disease, overcrowd, and shade the crop plant.

If the hole is too small, the plant is likely to become constricted at the mulch level, leaving no internal stem passage for water an nutrients. If the plant is abraded by the mulch it has an opening through which insect borers and disease organisms may pass. Most importantly, with a non-permeable mulch, such as plastic, there is no way for water to reach the root system.

A British Patent, No. 556,842, (1943) in the name of Turner, suggests starting out with a series of small holes in the mulch which have perforated lines radiating outward. The purpose is to have the plant enlarge the hole as it grows. This does not solve the problem of an over-tight fit preventing adequate water absorption. This may even exacerbate the situation because the resultant flaps being forced outward and upward will probably form a dam.

Damming must also be carefully avoided when forming the openings by hand, as in the previously mentioned Eckart Patent, U.S. Pat. No. 1,377,566, (1921). The folding, over or under, of flaps creates an inherent water barrier.

Due to the fact that they all teach to be installed prior to planting, none of the four previously mentioned patented mulching sheets provide for a way of mulching the large number of crops whose seeds must be planted in bulk amounts, usually in wide row broadcasts. This is a necessary method of sowing for crops whose seed, due to low or uncertain germination percentages, must be planted in multiples of the actual number of plants desired in order to achieve the requisite seedlings.

This method of bulk seeding is also often necessitated by the small size of many seed varieties. It is sometimes impossible to control the proximate number of seeds dispersed or their exact location when on the ground. Some require light in order to germinate. It is implausible to utilize any of these randomly fabricated mulches in this situation.

Another patent listed in the name of C. F. Eckart, U.S. Pat. No. 1,553,035, (1925) teaches in the specification that a mulching sheet, which is perforated only by relatively small drainage openings with their flaps still attached, as illustrated in FIGS. 6A to 6B, can be laid on a plant bed before or after the plant stock is laid out. This is the only patent thus far in this discussion of prior art which even suggests that bulk seeding can occur, or any seeding can occur, before the mulching sheet is laid in place. Openings must be manually cut.

In order to apply artificial mulch to a broadcast crop, the suitable openings to accommodate the plants or seeds already sown must first be fashioned in the mulching sheet. As stated above, this is implausible, given the prior art, since the location of the plants will not be known until after they are germinated and a desired fraction retained after eliminating any extra or crowded surplus seedlings by selective thinning.

The unsolved need is a method which employs a mechanically prefabricated singulary artificial mulching sheet or film, of relatively simple and inexpensive manufacture, to be installed after seeding, that does not require any measuring or cutting after initial installation, that will provide the optimum yield spacing between plants, that will have the desired balanced hole size for a single plant at the precise optimum spacing location, and accomplish the necessary thinning function for a wide row or band bulk sowing, before the seeds germinate or are visible, while providing weed suppression for an entire growing season.

a patent issued in the name of Riedel, U.S. Pat. No. 3,998,006, (1976) for a multiple purpose agricultural weed suppressant and growth enhancement blanket attempts to solve this need by teaching, unlike all the proceeding patents that have been mentioned here thus far, that broadcast sown or wide row crops must be seeded prior to mulching.

The method employs a flexible light impermeable sheet with a plurality of openings bonded to a fibrous blanket, as illustrated in FIG. 7. One embodiment of this device has areas of the blanket omitted, presumably in a selective pattern, although no mention is made of either hole size or spacing between holes. The blanket side of this lamination is laid on seeded soil. This suspends the sheet over any opening in the blanket, creating an enclosure.

Since many vegetables, including celery and lettuce, and flowers require light for the seeds to germinate, this method immediately becomes impractical for use.

Another disadvantage of using this method is that it promulgates the precise conditions which cause damping-off disease. This is a fungal disease which causes seedlings to wilt, usually within the first five days following germination. It is caused by poor lighting, lack of air circulation, and excess moisture. This could be treated with fungicide but the seedlings under the top sheet cannot be seen to detect the presence of the disease. There is also no way to apply any remedy without tearing off the top sheet and thereby negating the device.

Another problem is that the seedlings cannot be seen until they, hopefully, find their way to one of the openings in the top sheet of the device. This disadvantage is twofold. First, there is a substantial time lapse before a hole under which a seed failed to germinate would be detectable. Any attempt to re-seed the empty areas, called plugging, would be delayed. When this happens, the first germination of seedlings are usually so far ahead that they shade out the tinier growth when wide rows are used. Second, should more than one seed germinate under a hole, there is no way to pinch off the extra plant or plants at soil level without first removing the top sheet by tearing it off. If the extra plants are pulled out through the hole, the root systems will come out with them and probably also bring the root system of the desired plant along.

Lastly, with crops whose ideal spacing is in the five to ten centimeter range, as is the norm with most wide row crops, the lining up of bottom blanket holes to top sheet holes must require a great deal of effort. The two layers must then be joined together by some method. Labor expended on pre-forming such a device must be subtracted from labor saved by using it. If more than a single hole in the top sheet is positioned over a bottom blanket opening, the spacing and growth control presumptions of the device are suspect, as illustrated in FIG. 7.

It is apparent that, with the exception of U.S. Pat. No. 3,998,006 in the name of Riedel (1976), all of the prior art teaches away from broadcast seeding prior to application of mulch which has pre-formed openings to make this method feasible. Since this is a crowded field and the single reference to a method of using artificial mulch for wide row crops is troubled by the aforementioned problems, it is understandable why artificial mulching sheets are not commonly implemented with wide row plantings.

Rather than forego the space savings and increased yield efficiencies of wide row planting, which occur by the reduction of the number of non-productive access paths necessary between rows of plants, growers have been forced to utilize other methods of weed control for those crops. The alternative is manual weeding.

The most benign and environmentally friendly of these methods is the employment of loose, usually organic in nature, mulch. These loose mulches include peat moss, straw, and grass clippings. Some are expensive and all require considerable effort to apply around the multitude of plants in a wide row or dense crop. Several applications are usually necessary due to the tendency of loose mulch to compact, or to blow away, before compacting. The plantings must be in a relatively advanced state of growth before the necessarily thick layer of mulch, to compensate for compaction, can be applied. This mandates at least one weeding prior to application.

All other methods require the use of chemical herbicdes. These are expensive and require both labor and equipment to apply. They are also potentially toxic to humans and animals.

The only coloration requirement for artificial mulch is that it be opaque; anything but clear will prevent weed and plant growth. Most prior art stipulates a dark or black coloration for the purpose of warming the soil for enhanced plant growth. German Pat. No. DE 4,224,782, (1994) in the name of Hugo, teaches that either a light or dark coloration can be used to control temperature. The device can be filled with metal platelets and pigmented as required. Choice of color depends on the number of sunny days at the place of use.

Attempts to use artificial mulch in concert with chemical nuisance control agents have been made. British Patent No. 556,842, (1943) in the name of Turner, suggests impregnating the mulching cover with an insect repelling substance. Recent research has linked pesticides with several forms of cancer. A large and growing segment of both commerical and private growers, among them Prince Charles of England, have now foregone the use of pesticides, herbicides, fungicides, and all chemical based fertilizers. However, a repellent is not necessarily a poison. It is possible that a repellant placed at ground level would merely force insects upward into a plants foliage and keep them there.

The organic growing movement espouses the use of either naturally occuring substances or those which are non-toxic to any form of life, providing they are either biodegradable or recyclable. Organic pest controls and fertilizers, while not acting as fast as their chemical counterparts, can be used to grow any crop. A patent such as U.S. Pat. No. 2,030,267 (1936), in the name of Pratt, for a mulching strip coated with a fungicide and fertilizer would be totally unacceptable to an organic grower. With standard for this growing industry, which are now becoming established, anything grown using such a mulching strip, whether produce or flowers, could not be labeled or sold as organic.

Mulching is probably the most important requisite for any organic growing method. Whether the mulch used is loose organic or recyclable artificial, it enables the soil microorganisms which supplant the use of artificial fertilizers to perform their function in the top layers of soil. Ironically, all mulches provide the perfect habitat for slugs and snails, nature's most voracious plant destroyers.

Slugs and snails discourage many growers from using any mulch at all, despite the advantages. Slugs feed on plants during the night, providing they have something to hide under during the day. The author of the most widely read book on gardening ever, "The Victory Garden" of television fame, has written that he stopped all mulching in general because of the slug problem it engendered. They can be poisoned by spreading metaldehyde meal or pellets around but great care must be taken to keep it away from any edible crops. It is also a known killer of birds and animals.

Organic methods of control range from trapping them to spreading agricultural grade diatomaceous earth, an abrasive which consists of the skeletons of dead plankton, in a protective circle around the plants. The tiny skeletons in the diatomaceous earth, which is also called diatomite, irritate and lacerate the smooth skin of slugs and snails so they will not crawl on it very far. They also die from ingesting it, since it destroys their digestive systems. It is an effective method of control, which is non-toxic to humans, animals, and birds. Other pests that are destroyed by it are aphids, cabbage worms, cutworms, cabbage maggots, various beetles, and sowbugs.

It is very time consuming to circle plants with diatomaceous earth. To apply it around the densely packed plants of a wide row is impractical. It must be applied often since it is susceptible to being blown away by even moderate winds; any substantial watering or rainfall with leech it into the soil. The prior art not contain any references to diatomaceous being used in conjunction with any artificial mulch.

All the artificial mulching materials heretofore known suffer from a number of disadvantages:

a) None can be used for the prevention of weeds in a maximum yield wide row crop without post-factory alteration or concessions to crop choice limitation, disease susceptibility, under-planting, or over-planting.

b) None are specifically designed to precisely position plants in a wide row pattern predetermined to maximize space use and ensure adequate growing room.

c) None provide inherent and effortless crop thinning, which is an unexpected advantage that would be gained by the above mentioned weed prevention positioning.

d) None provide inherent and effortless non-chemical protection from root maggots, also known as cabbage maggots.

e) None provide for an inherent non-poisonous defense against myriad varieties of flying and crawling insects, which destroy crops, without taking the risk of diverting them to other, more susceptible areas.

f) None provide for an inherent non-poisonous defense against slugs and snails.

OBJECTS AND ADVANTAGES

Accordingly, several objects and advantages of the present invention are:

a) To provide non-chemical method of weed prevention for wide row crops using an artificial mulch which requires no additional modification by the user or limitations as to its usefulness.

To provide a means to precisely position plants in a wide row pattern predetermined to maximize space use and ensure adequate growing room.

c) To provide a method of passive crop thinning as an unexpected advantage of the combination of weed prevention and precise positioning.

d) To provide a method of non-chemical root maggot prevention as an unexpected advantage of the means used to pattern wide row crops.

e) To provide a means of defense against the myriad varieties of flying and crawling insects which destroy crops, without the use of chemical poisons.

f) To provide a non-poisonous means of deterring slugs and snails.

Further objects and advantages are to provide an artificial mulch which is easily and inexpensively manufactured, which is recyclable or biodegradable, which has season-long durability, which is reuseable, which prevents splash spreading of soil borne disease, which raises soil temperature, which keeps edible crops clean, and which helps retain soil moisture. Still further objects and advantages will become apparent from a consideration of the ensuing description and drawings.

SUMMARY OF THE INVENTION

The present invention and method of use artificial mulching material to be utilized on crops whose method of growing has, until now, made the use of prior artificial mulching materials impractical. By selectively pre-perforating opaque mulching sheets, of a predetermined thickness, during manufacturing process with uniformly sized and spaced visible holes in a predetermined pattern, it will be possible to forego the use of chemical herbicides and manual weeding on the majority of crops which benefit from the wide row method of planting.

The mulching sheets provided with these precisely spaced and sized perforations will position plants of a crop in an optimal pattern to maximize space efficiency and allow adequate room for proper plant growth. They will also eliminate the need for manual, perhaps imprecise, thinning of the chosen crop in addition to the elimination of weeds.

The precise predetermination of the size of the pre-perforated holes in the mulching sheet will also provide for a non-chemical defense against root maggot infestations in crops where the present invention is employed.

In most of the embodiments of the present invention, it is necessary only to lay the mulching sheets provided over a pre-seeded planting area, or bed, to achieve all of these advantages.

In other embodiments, the present invention comprises elements which, without the use of toxic chemical or pesticides, provide for the elimination of slugs and other crop destroying insect pests. Those embodiments are laid on pre-seeded beds.

The present invention can be manufactured from any of the artificial mulching material currently in use, or any opaque material of sufficient flexibility to afford ease of handling. Any material used must be anchored in place by weighing down perimeter areas or burying those areas in the soil.

In all embodiments of the present invention, the prevention of weeds is accomplished by the non-transmission of light to areas of soil underneath the mulching material which are not exposed by openings. The prevention of slugs and snails is accomplished by the incorporation of an abrasive substance which is fatal to them either by contact or ingestion. The elimination of flying and crawling insect pests is accomplished by trapping them in a weatherproof sticky substance which they either encounter by chance or are attracted to by the use of color, either on the mulching material or in the sticky substance itself.

DRAWINGS FIGURES

In the drawings, closely related figures have the same number but different alphabetic suffixes.

FIGS. 1A to 1C show several views of a perforated wide row mulching sheet.

FIGS. 2A to 2C show several views of a perforated wide row mulching sheet with planting holes circled with adhered abrasive. The top side is coated with abrasive in this embodiment to protect the abrasive during handling. When utilized, the abrasive can be placed facing upwards or downwards, depending on the preference of the user.

FIGS. 3A to 3C show several views of a perforated wide row mulching sheet with abrasive adhered to one side. The side is coated with abrasive in this embodiment to protect the abrasive during handling. When utilized, the abrasive can be placed facing upwards or downwards, depending on the preference of the user.

FIGS. 4A to 4C show several views of a perforated wide row mulching sheet with abrasive adhered to both sides.

FIGS. 5A to 5D show various procedure taken to establish planting holes in non-perforated mulching sheets. All drawings are taken and re-labeled from prior art U.S. Pat. No. 1,377,566 (1921) in the name of Eckart. This patent is cited in the prior art description.

FIGS. 6A and 6B show one variation of a puncture and puncture pattern used for drainage and irrigation purposes. Both drawings are taken and re-labeled from prior art, U.S. Pat. No. 1,553,035 (1923) in the name Eckart. This patent is cited in the prior art description.

FIG 7 shows a multi purpose growth device. This drawing is taken and re-labeled from prior art, U.S. Pat. No. 3,998,006 (1976) in the name of Riedel, assigned to the Conwed Corporation, St. Paul, Minnesota. This is cited in the prior art description.

FIGS. 8A and 8D show a perforated wide row mulching sheer coated on the top side. FIG. 8B has a weatherproof sticky substance which is covered by a removable protective film; FIG. 8C has an abrasive substance adhered to it. Either the mulching material or the weatherproof sticky substance, or both, may be colored in an insect attractant color, such as yellow, but such an embodiment cannot be shown in these drawings.

| Reference Numerals in Drawings | |
| --- | --- |
| 1 Mulching material - opaque | 7 Abrasive substance - top side |
| 2 Slice line | 8 Abrasive substance - bottom side |
| 3 Flap | 9 Removable protective film |
| 4 Ballast material | 10 Hole |
| 5 Drainage puncture | 11 Weatherproof sticky substance Clear or insect attractant colored |
| 6 Cellulose blanket | 12 Insect attractant colored mulching material |

DESCRIPTION OF PREFERRED EMBODIMENT-FIGS. 8A to 8D

Figure 8A:
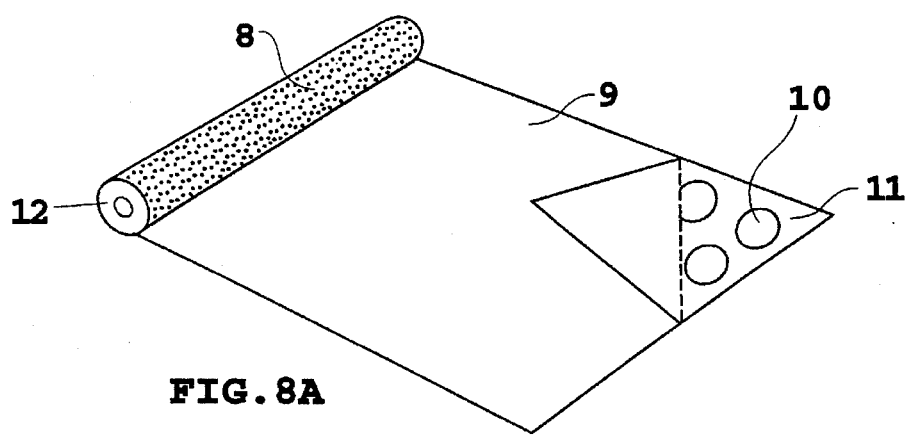
Figure 8B:
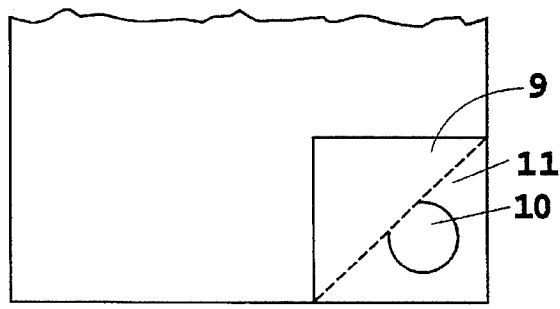
Figure 8C:
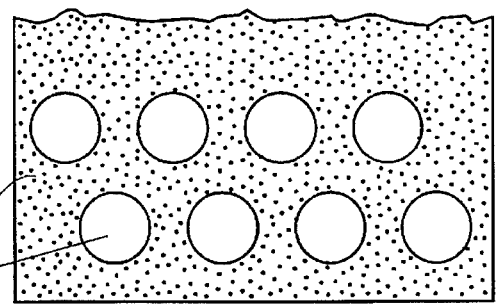
Figure 8D:
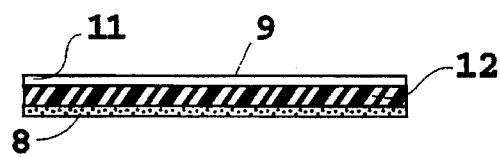

In this preferred embodiment of the present invention, FIG. 8A shows a perspective view of an opaque insect attractant colored mulching material 12 of a predetermined thickness which has been selectively preforated in a predetermined continuous pattern with visible holes 10 of a predetermined uniform size and shape with a predetermined space between them. A layer of weatherproof sticky substance 11, either clear or also of an insect attractant coloration, has been applied to the top side of the sheet and is covered by a removable protective film 9. FIG. 8B shows a top view of this embodiment with weatherproof sticky substance 11 and hole 10 exposed by peeling back removable protective film 9. FIG 8C shows a bottom view of this embodiment with the underside of removable protective film 9 visible and a layer of abrasive substance 8 adhered to the sheet. FIG. 8D shows a side view of this embodiment with abrasive substance 8 on the bottom adhered to insect attractant colored mulching material 12 that is below weatherproof sticky substance 11 which is covered by removable protective film 9.

DESCRIPTION OF ELEMENTS

Embodiments of the present invention described and illustrated by figures thus far in this description show many, but not all, of the various combination with which the elements of the present invention can be assembled to eliminate previously unsolved problems. The automated factory preperforation of the artificial mulching material 1 with uniformly sized visible holes 10 of predetermined size, shape, and space between them is an intangible element but nevertheless is an invaluable component of this invention for plants with a spacing requirement of thirty centimeters or less, known as wide row crops.

Figure 1A:
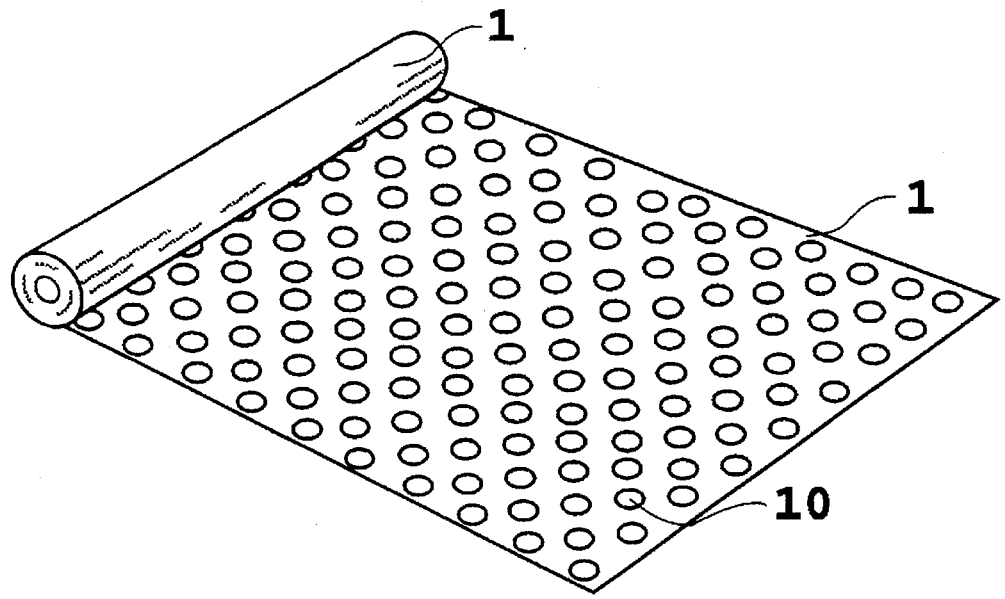

The factory level perforation of holes 10, either by punch or rollers equipped with a pattern of xyresic bits or other methods, is the only way that the myriad number of holes 10 (see FIG. 1A) required for closely and densely planted wide row crops become practical attain (see prior art FIGS. 5A to 5D and FIG. 7). Without this preperforation, artificial mulch is incapable of being fashioned into the precise pattern of uniformly sized holes 10 and soil coverage which strike a balance between providing weed prevention and allowing sufficient room for the plant stems to grow.

The composition of artificial mulching material 1 has a single essential requirement for weed prevention: opacity. Various material will gather more heat than others, provide better water absorption and drainage, last longer, be easier to handle, or cost less. All must be opaque. Some of those used, and their particular qualities are: plastic, which usually colored black and ranges in thickness from one to five mils, has an excellent heat absorbing quality. The type of plastic used is usually polyethylene which is inexpensively manufactured in sheet form by the process known as film blowing. It is easy and can be used for many seasons if a reasonable amount of care is taken. Water absorption and drainage do not occur unless punctures are made either for drainage, planting, or both; the utility of the present invention can be seen by comparing FIG. 1A and FIGS. 5A to 5D. A recent development to overcome this disadvantage is Miracle Mulch® polyethylene which utilizes non-visible microscopic holes throughout to allow water to pass through. Black polyethylene is the most commonly used of all the artificial mulching material 1 that are available; landscape fabric, which is usually colored black and comes in several thicknesses, has only moderate heat absorbing qualities. This is due to the fact that it is a woven fabric and has visible interstices between the threads which allow heat to escape. This same feature provides excellent water absorption and drainage. It is easy to handle and is the longest lasting of all artificial mulching materials 1. Due to the expensive cost of the weaving process, this product is not as widely used for mulching as its qualities would warrant; non-woven geotexile fabric, which is usually black and comes in two thin weight classes, has fair heat absorbing qualities. It is made by compressing texile shards into a semi-dense weave which allows water to pass through it slowly by seepage. It is stiff to handle and will not last more than a season or two if walked upon folded for storage. Due to its relatively low cost, it is used less frequently than plastic but slightly more than landscape fabric; biodegradable paper, which is usually neutral in color and somewhat thick, and has a low amount of heat absorption. It is made by pressing biodegradable paper fibers together and therefore lasts only for a season or less. It is not easy to handle and provides very slow water absorption through seepage. It is very expensive and its only advantage is that it does not have to be removed after a growing season due to the fact that it disintegrates; horto paper, which is a dark brown color and very thick, has a fair amount of heat absorption. It is made by pressing biogradable peat moss into a cardboard composition which is most expensive of all artificial mulching materials 1. The chief advantage is that it breaks down into a valuable soil amendment.

Figure 1B:
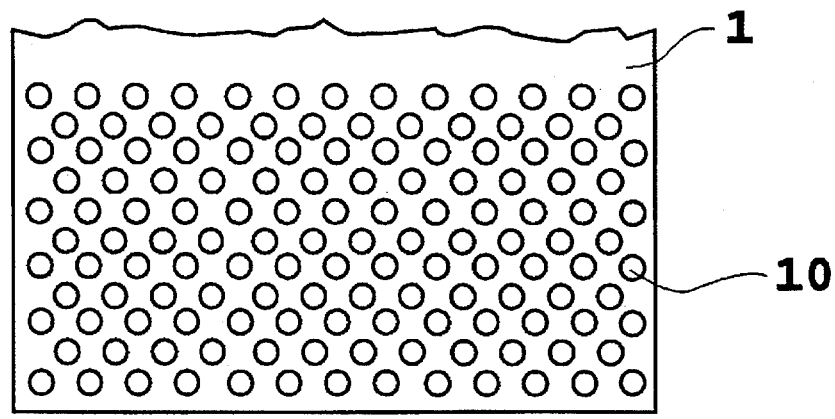
Figure 1C:
Figure 2A:
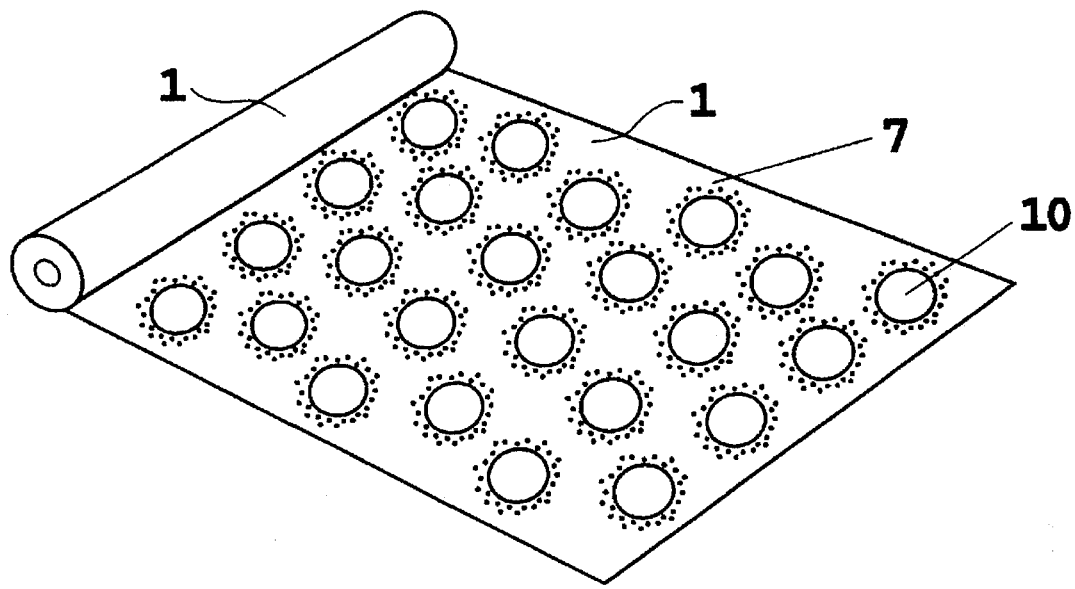
Figure 2B:
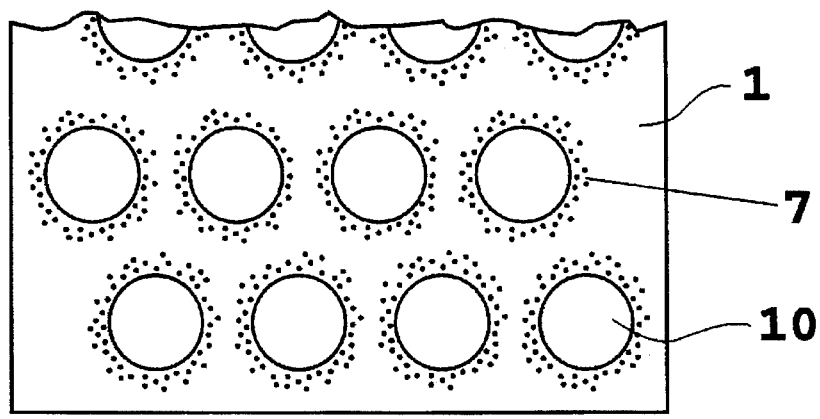
Figure 2C:
Figure 3A:
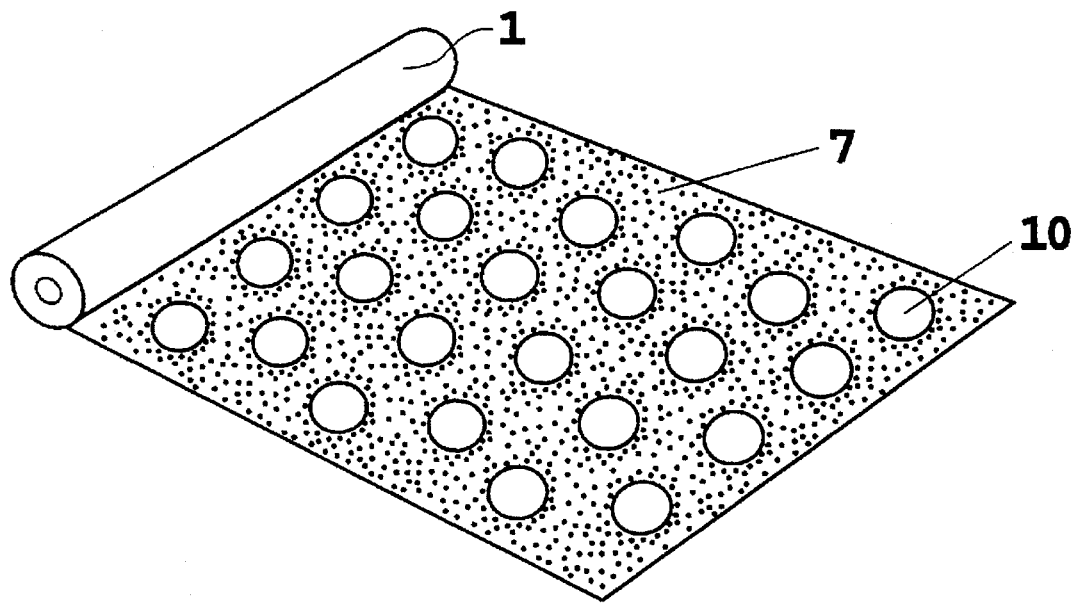
Figure 3B:
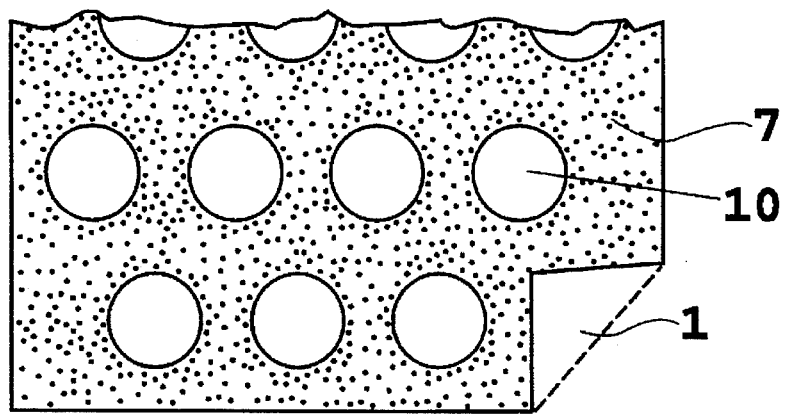
Figure 3C:
Figure 4A:
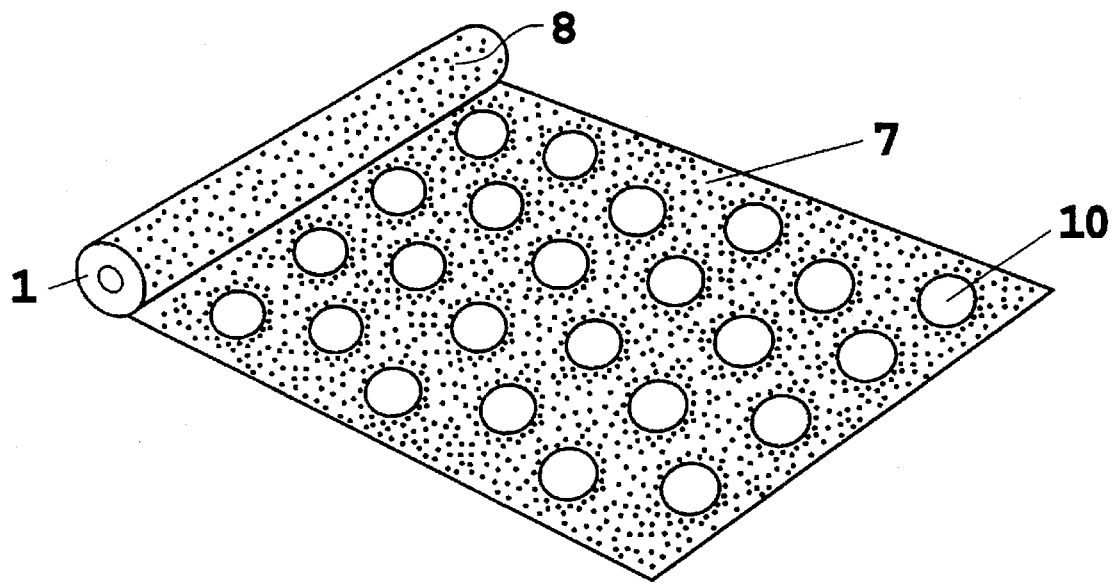
Figure 4B:
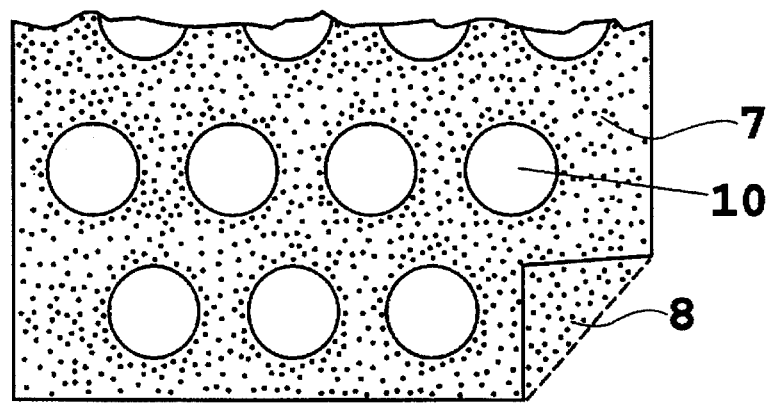
Figure 4C:
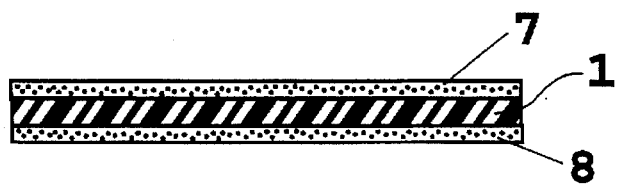

All of these artificial mulching materials 1 can be used in the present invention. The use of a punch press, xyresic bit equipped roller, or any other known method of perforation can be easily incorporated along the production line of any of them to form the holes 10 (see FIG. 1B) integral for the embodiments of the present invention. All of these mulching materials 1 can have adhesive applied by either spray or roller methods to adhere an abrasive substance 7 dropped, blown, or dusted upon them (see FIG. 4B). They can all be dyed, pigmented, or otherwise colored to transform them, into insect attractant colored mulching materials 12 (see FIG. 8A) which would be a shade of yellow, usually pale, which would only be used in conjunction with either attractant colored or clear sticky substance 11 for the purpose of trapping insects. All of these mulching materials 1 can have a weatherproof sticky substance, clear or insect attractant colored 11 applied by roller method, a removable protective film 9 can then be roller fed directly onto weatherproof sticky substance, clear or insect attractant colored 11 which will hold it in place (see FIG. 8A).

Ideal embodiments of the present invention, with all advantages and disadvantages of the presently available artificial mulching materials 1 considered, would employ polyethylene plastic, two or three mils thick. The color would be black for maximum heat absorption, which aids in seed germination, in all embodiments except those made from an insect attractant colored polyethylene 12 and using a clear or yellow colored weatherproof sticky substance 11 from which more aggressive insect eradication is achieved than can be attained by using sticky substance 11 on black mulching material 1.

The composition of the abrasive substance-top side 7 and abrasive substance, bottom side 8 is the same, the difference in designation is made only because a difference in the thickness of either layer might be desirable. The material should be one that irritates, dehydrates, or lacerates the bodies of insects, caterpillars, larva, snails, and slugs as they attempt to pass over or under it. A further attribute would be that abrasive substance 7 or 8 lacerate or abrade the digestive tracts of garden pests that ingest it. It is also necessary that the material not be toxic. Preferably, a naturally occurring material would be used. Diatomaceous earth, also called diatomite, fulfills all of these requirements, is inexpensively available from most chemical companies, and would be the substance chosen for an ideal embodiment of the present invention.

The weatherproof sticky substance, clear or insect attractant colored 11 can be any gummous compound, such as rosin-rubber-mineral oil, which remains flexibly adhesive for an extended length of time and will trap insects. The sticky quality should not be affected by water or direct sunlight. An ideal embodiment of the present invention would utilize weatherproof sticky substance 11 as the adhering material for abrasive substances 7 and 8 to increase the level of insect protection afforded and to simplify production. With clear or pale yellow coloration provided, the number of potential embodiments available when used with either black or pale yellow mulching material 1 or 12 is multiplied.

The removable protective film 9 can be any lightweight sheet material that will not form a permanent or vigorous bond with weatherproof sticky substance 11. Materials such as paper coated with wax and thin plastic polymers can be used. If cost and availability factors are negligible, a transparent or even translucent material would furnish additional utility by enabling the user to lay it atop growing plants after it is removed from weatherproof sticky substance 11 (see FIG. 8A) to provide a physical protection barrier with a residual insect trapping capacity. This would be an element of an ideal embodiment of the present invention.

The distances between and the diameters, if circular, of the factory preperforated holes 10 is as essential an element, and just as intangible, as the perforation process. As the distance necessary between plants, and therefore the distance between corresponding holes, increases, the number of holes necessary in a sheet of mulching material 1 decreases. The advantage gained by machine perforation also decreases as the distance between plants, or spacing, increases. Research has shown that more than eighty percent of all edible crops and ninety percent of all flowers require a spacing of thirty centimeters or less. It is for this reason that a comprehensive system of labor saving mulches must include preperforated embodiments. For plants whose ideal spacing requirements are more than thirty centimeters between plants it is suggested that the labor involved in forming the number of holes required does not warrant factory preperforation, nor is wide row planting practical for such plants due to the fact that three plants across the width of the row would require a full meter or more, which is beyond a comfortable reach for harvesting and other necessary activities. For the purpose of deriving an ideal set of embodiments, and in no way intending to limit other variations of the present invention, four classes of spacing have been determined from the center of each hole 10 to the center of the adjacent hole 10 in each row of holes, and from the centerline of the holes 10 in each row to the centerline of the holes 10 in each preceding and succeeding row. Since any, though small, spacing advantage is desirable when optimizing, a small spacing gain can be obtained by staggering each hole 10 in a row at a right angle to the centerline between the holes 10 of the preceding and succeeding rows at the midpoints between the holes 10 of the preceding and succeeding rows. An echelon pattern is thus formed from adjacent rows with slightly more space on the diagonal oblique between rows (see FIGS. 1A to 4A). The distances of the four classes of spacing thus measured and examples of vegatables which can be grown in each are:

Six Centimeters: carrots, peas, snow peas, scallions, radishes, salsify.

Ten Centimeters: spinach, beets, onions, bush beans, kohlrabi, lima beans.

Eighteen Centimeters: strawberries, swiss chard, leaf lettuce, peanuts, celeriac.

Thirty Centimeters: cabbage, corn, head lettuce, broccoli, everbearing strawberries, kale.

Figure 5A:
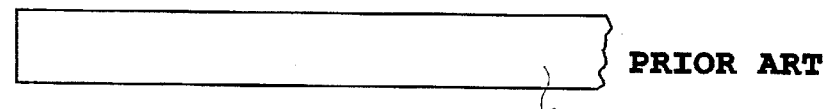
Figure 5B:
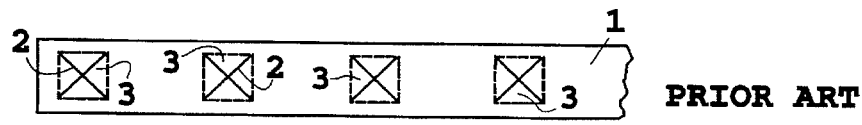
Figure 5C:
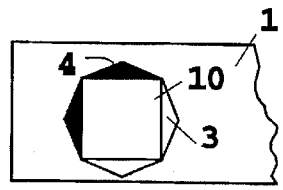
Figure 5D:
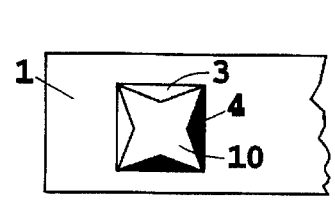
Figure 6A:
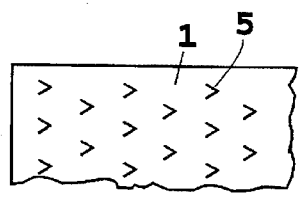
Figure 6B:
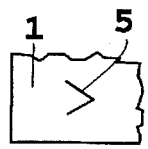
Figure 7:
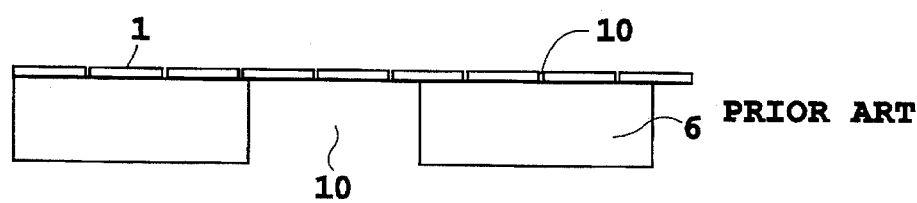

It must be noted here that for each of the twenty three crop plants listed above, the prior art teaches that the steps and labor illustrated in FIGS. 5B and 5C must be taken for each individual plant in each of these crops in order to use singulary artificial mulching material 1 to grow them. This realization explains precisely why artificial mulching material 1 is not used on them. Herbicides, though dangerous, and manual weeding, though laborious, are still the preferred methods of weed control for all of them.

For the purpose of deriving an ideal set of embodiments, and in no way intending to limit other variations of the present invention, round holes 10 have been chosen and ideal diameters have been determined by research for each of the four classes of spacing and the crops they service. The main criteria for hole 10 diameter are the sizes of the plant stems and the need for irrigation at the bases of plant stems. Weed prevention and the unexpected advantage of root maggot control are subordinate criteria. Root maggots are the larva of small black flies that lay their eggs at the base of the plants; when the eggs hatch the larva burrow into the soil around the plant and attack the root system. They can destroy 80% of all crops, such as carrots, radishes, and onions. They are usually controlled by the pesticide diazanon, but collars can be fashioned around the base of plants to prevent them from burrowing. A hundred carrots would require a hundred collars, handmade. Since the present invention provides ready made collars, the criteria for stem clearance and irrigation are kept to an absolute minimum to gain the advantage of non-chemical root maggot control. The ideal optimum diameters for each of the four classes are:

| Six centimeter spacing | Two centimeter hole 10 |
| Ten centimeter spacing | Four centimeter hole 10 |
| Eighteen centimeter spacing | Five centimeter hole 10 |
| Thirty centimeter spacing | Seven centimeter hole 10 |

Combining the qualities of the foregoing elements provides a preferred embodiment of the present invention which consists of a sheet of opaque pale yellow polyethylene 12, 3 mils thick, preperforated with a staggered pattern of uniform holes two centimeters in diameter and spaced six centimeters apart; one side of yellow polyethylene 12 has a layer of diatomaceous earth 8 adhered to it by a rosin-rubber-mineral oil compound 11; the opposite side of yellow polyethylene 12 is coated with a layer of rosin-rubber-mineral oil compound 11 which is covered by a removable film of clear polyethylene 9.

OPERATION OF INVENTION

The preferred embodiment above is utilized by preparing a piece of ground for planting and then sowing a generous amount of seed in a wide row pattern. Overseeding and spacing need not be a concern. After the seeds are raked in or otherwise covered, water the entire seedbed. Mulching sheet 12 is laid over the seeded area with the diatomaceous earth 8 side facing down on the soil. This will ensure that slugs and snails cannot take refuge underneath the mulch during the day and will kill any that wander in by night. Remove clear polyethylene film 9 before weighing down edges of mulch 12 to anchor (see FIG. 8A). Rosin-rubber-mineral oil compound 11 will now trap flying and crawling insect pests which will be drawn to it by yellow coloration of material 12. Mulch will now admit light only to predetermined location and pattern of holes 10. Weeds and excess seeds will not grow under areas covered by mulch, thereby eliminating spacing, thinning, and weeding. Clear polyethylene removable protective film 9 can be used to cover more advanced crops as it will admit light and will have some residual insect trapping capacity. When seedlings appear, spot seed any bare spots. When plants mature, root maggot collars will be snug in place.

With all embodiments, always install side with abrasive substance 7 or 8 downward in contact with soil. Embodiments with abrasive substances 7 or 8 on both sides can be rolled directly onto the bed (see FIG. 4A).

With all embodiments, always install the side with weatherproof sticky substance, insect attractant or clear 11 and removable protective film 9 facing upward, away from the soil (see FIG. 8B).

With perforated embodiments that have abrasive substance 7 circling plant holes 10, it is recommended that abrasive substance 7 be placed facing downward towards soil, unless the opposite side is fully covered with abrasive substance 8.

Always install perforated mulching material 1 after seeding.

The embodiment which circles holes 10 with abrasive substance 7 or 8 is only practicable with the thirty centimeter spacing class.

The terms bulb, seed, plant, seedling, crop plant, sown seed, sown plant and others I use in reference to this invention are used in the broadest sense and are intended to apply to all planting material of whatever kind or nature.

The terms broadcast, sown crop, sown planting, wide row, dense crop, dense planting, bulk planting, bulk seeding, and bulk sowing are all used in the broadest sense in this invention and are interchangeable.

CONCLUSION, RAMIFICATION, AND SCOPE OF INVENTION

Accordingly, the reader will see that the mulching system of this invention can be used on crops which with the use of artificial mulching materials for the prevention of weed growth was formerly considered impractical. Furthermore, the improved all-purpose mulch system has the additional advantages in that:

it provides spacing between plants to maximize space efficiency and still ensure optimum growing areas for plants;

it provides passive crop thinning;

it provides non-chemical elimination of root maggots;

it provides defense against all flying and crawling insect pests which destroy crops without using toxic chemicals or pesticides;

it provides a non-toxic method of eliminating slugs and snails.

Although the description above contains many specificities, these should not be construed as limiting the scope of the invention but as merely providing illustrations of some of the preferred embodiments of this invention. Many other variations are possible.

Thus, the scope of the invention should be determined by the appended claims and their legal equivalents, rather than by the examples given.

I claim:

1. An agricultural growth enhancement method comprising the steps of:

a. sowing a selected type of seed upon the earth in a manner consistent with the type of seed selected; and b. providing an opaque sheet of unitary composition selectively pre-perforated with a predetermined pattern of visible holes of a predetermined size and shape with a predetermined space between them, said opaque sheet having an upper and lower surface; and c. applying a gummous weatherproof sticky substance onto said opaque sheet except where said holes occur; and d. applying diatomaceous earth to said gummous weatherproof sticky substance on said opaque sheet to loosely affix said diatomaceous earth to said opaque sheet; and e. placing said opaque sheet upon the seeded earth so that only a predetermined fraction of said seeds exposed by said holes will germinate and continue to grow.

2. An agricultural growth enhancement method comprising the steps of:

a. sowing a selected type of seed upon the earth in a manner consistent with the type of seed selected; and b. providing an opaque sheet of unitary composition selectively pre-perforated with a predetermined pattern of visible holes of a predetermined size and shape with a predetermined space between them, said opaque sheet having an upper and lower surface; and c. applying a clear gummous weatherproof sticky substance onto said upper surface of said opaque sheet except where said holes occur; and d. applying a removable protective film over an upper surface of said clear gummous weatherproof sticky substance and said holes, whereby said removable protective film can be removed from said clear gummous weatherproof sticky substance subsequent to said lower surface of said opaque sheet being placed upon the seeded earth so that only a predetermined fraction of said seeds exposed by said holes will germinate and continue to grow.

3. A method as recited in claim 2 wherein said gummous weatherproof sticky substance is insect attractant colored.

4. A method as recited in claim 2 wherein said opaque sheet is insect attractant colored.

5. A method as recited in claim 2 wherein said gummous weatherproof sticky substance and said opaque sheet are both insect attractant colored.

6. An agricultural growth enhancement method comprising the steps of:

a. sowing a selected type of seed upon the earth in a manner consistent with the type of seed selected; and b. providing an opaque sheet of unitary composition selectively pre-perforated with a predetermined pattern of visible holes of a predetermined size and shape with a predetermined space between them, said opaque sheet having an upper and lower surface; and c. applying a gummous weatherproof sticky substance onto said opaque sheet except where said holes occur; and d. applying diatomaceous earth to said gummous weatherproof sticky substance on said opaque sheet to loosely affix said diatomaceous earth to said opaque sheet on said lower surface; and e. applying a removable protective film over an upper surface of said clear gummous weatherproof sticky substance and said holes, whereby said removable protective film can be removed from said clear gummous weatherproof sticky substance subsequent to said lower surface of said opaque sheet being placed upon the seeded earth so that only a predetermined fraction of said seeds exposed by said holes will germinate and continue to grow.

7. A method as recited in claim 6 wherein said gummous weatherproof sticky substance is insect attractant colored.

8. A method as recited in claim 6 wherein said opaque sheet is insect attractant colored.

9. A method as recited in claim 6 wherein said opaque sheet and said gummous weatherproof sticky substance are both insect attractant colored.

* * * * *

UNITED STATES PATENT AND TRADEMARK OFFICE
CERTIFICATE OF CORRECTION

PATENT NO. : 5,644,998

DATED : July 8, 1997

INVENTOR(S) : Edward Krolick

It is certified that error appears in the above-indentified patent and that said Letters Patent is hereby corrected as shown below:

On title page, item [76] should read as follows:

Inventor: Edward Krolick, 4643 Sun Valley Drive, Las Vegas, Nevada 89121

Signed and Sealed this

Fourth Day of November, 1997

*Attest:*

BRUCE LEHMAN

*Attesting Officer*     *Commissioner of Patents and Trademarks*